United States Patent
Abdulrahiman et al.

(10) Patent No.: US 7,610,350 B2
(45) Date of Patent: Oct. 27, 2009

(54) WIRELESS INFORMATION TRANSMISSION SYSTEM AND METHOD

(75) Inventors: Najeeb Abdulrahiman, Fremont, CA (US); Gabriel Dalbec, San Jose, CA (US)

(73) Assignee: PalmSource Inc., Sunnyvale, CA (US)

( * ) Notice: Subject to any disclaimer, the term of this patent is extended or adjusted under 35 U.S.C. 154(b) by 338 days.

(21) Appl. No.: 09/917,070

(22) Filed: Jul. 26, 2001

(65) Prior Publication Data

US 2003/0023671 A1    Jan. 30, 2003

(51) Int. Cl.
 *G06F 15/16* (2006.01)
(52) U.S. Cl. .................. 709/217; 709/205; 709/206
(58) Field of Classification Search .......... 709/203, 709/217, 246, 230, 219, 245; 455/3.03, 419
See application file for complete search history.

(56) References Cited

U.S. PATENT DOCUMENTS

| | | | | |
|---|---|---|---|---|
| 6,430,624 | B1 * | 8/2002 | Jamtgaard et al. | 709/246 |
| 6,473,609 | B1 * | 10/2002 | Schwartz et al. | 455/406 |
| 6,498,897 | B1 * | 12/2002 | Nelson et al. | 386/125 |
| 6,871,236 | B2 * | 3/2005 | Fishman et al. | 709/246 |
| 2002/0109706 | A1 * | 8/2002 | Lincke et al. | 345/700 |
| 2002/0124020 | A1 * | 9/2002 | Janakiraman et al. | 707/513 |
| 2002/0132607 | A1 * | 9/2002 | Castell et al. | 455/412 |

FOREIGN PATENT DOCUMENTS

JP    11-313172    *    9/1999

OTHER PUBLICATIONS

Herrera, Chris "Windows CE 2.x Mobile Channel Links," Nov. 11, 1999, http://www.cewindows.net/wce/20/mobilechannels.htm.*
Mei, Hsing "Turning an HTTP Proxy Server into Wireless Internet Gateway," Oct. 21, 2000, http://web.archive.org/web*/http://www.isoc.org/inet2000/cdproceedings/3b/3b_1.htm.*
Hall, Rich "The New Handheld PC 2000," Jan. 2001, http://www.pocketpcmag.com/_archives/Jan01/hpc2000.asp.*

(Continued)

*Primary Examiner*—John Follansbee
*Assistant Examiner*—Nghi V Tran
(74) *Attorney, Agent, or Firm*—Berry & Associates P.C.

(57) ABSTRACT

A system and method for efficiently transmitting useful electronic information from a remote source location to a portable electronic device over a wireless connection is disclosed. A user of an electronic device issues a request to an information transmission system that electronic information be transmitted to the electronic device. The information transmission system retrieves the information from a remote source location and analyzes the information to determine its data format. The information transmission system then compares the data format to a list of supported or compatible data formats to determine if the requested information data format is supported. The information transmission system may also compare the source location of the requested information to a list of unacceptable source locations. The requested information may then be transmitted to the electronic device if the information has a supported format and an acceptable source location.

84 Claims, 3 Drawing Sheets

OTHER PUBLICATIONS

RealNetworks, Inc. "RealPlayer 8 Plus User Manual," Aug. 18, 2000, http://web.archive.org/web/*/http://service.real.com/help/player/plus_manual.8/rppmanual.htm.*

Michalski, Jeff "WAP Gateways and Servers: Delvering Wireless Content," Mar. 24, 2000, http://www.techonline.com/community/ed_resource/feature_article/5580?print.*

WAP Forum, "WAP Deployment Fact Sheet," Feb. 2000, http://www.wapforum.org/new/WAP_Deployment_Fact_Sheet_022000.doc.*

Microsoft, "Microsoft and Industry Partners Announce Next-Generation Windows-Powerd Handheld PCs," Sep. 7, 2000, http://www.microsoft.com/presspass/press/2000/Sept00/HPCPR.asp.*

Herrera, Chris "It's What's Under the Hood that Counts!" Aug. 2000, http://www.pocketpcmag.com/_archives/Jul00/underhood.asp.*

Timothy et al., "Web Page Filtering and Re-Authoring for Mobile Users," Apr. 1999, The Computer Journal, vol. 42, p. 534-546.*

Adobe Acrobat Reader for Palm OS, pp. 1-4, printed on Oct. 25, 2001 from the Website located at: http://www.adobe.com/prodcuts/acrobat/readerforpalm.html.

* cited by examiner

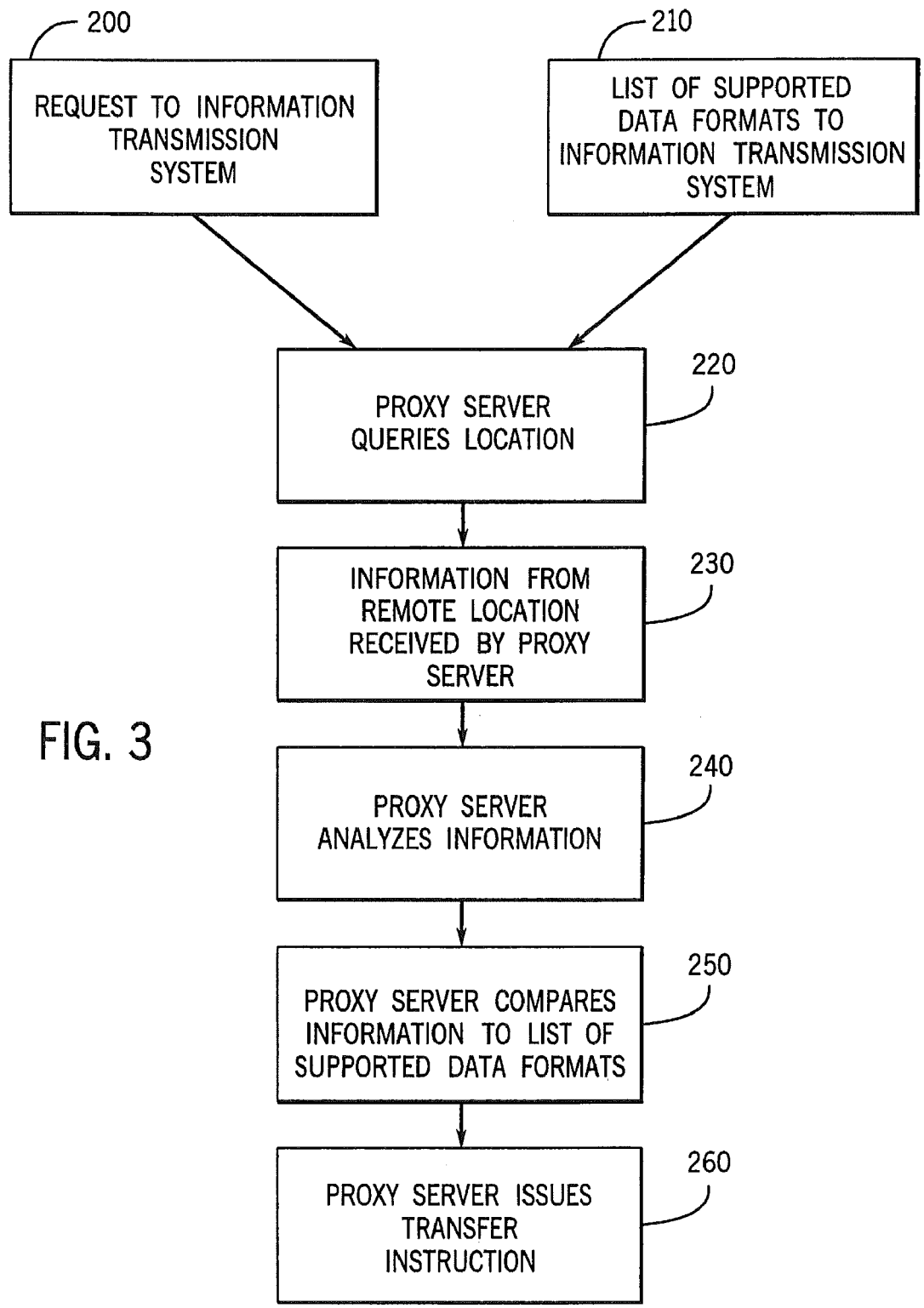

WIRELESS INFORMATION TRANSMISSION SYSTEM AND METHOD

BACKGROUND

Portable electronic devices generally allow users to perform a number of functions in an electronic medium. These devices may include programs or applications for personal information management, voice memo recording, wireless telephony and e-mail, and word processing. Database, spreadsheet, graphics, presentation, and other electronic applications may also be provided. One example of a portable electronic devices is a handheld computing device, sometimes referred to as a personal digital assistant (PDA), "palmtop," "palmheld," or "handheld computer." Other examples that may include the above functions include laptop computers, pagers, and mobile telephones.

Portable electronic devices may include programs or applications which allow a user to receive electronic information or data from remote locations, such as other handheld computers, personal computers, pagers, and World Wide Web sites. Thus, users of handheld computers may view the contents of a World Wide Web page or download electronic files or programs over a wireless network capable of transmitting the information to their particular location.

Conventionally, a difficulty with transmitting electronic information to a portable electronic device is that the bandwidth associated with wireless connections may be limited. Wireless connections do not conventionally allow transmission of data at rates comparable to those associated with hardware connections. For instance, a personal computer having a modem and connected to a computer network using phone lines may send and receive electronic information at 56 kilobits per second (kbps). With cable modem, digital subscriber line, T1, and T3 technology among others, data transfer rates many times that may be achieved. In contrast, wireless connections typically allow a maximum data transfer rate on the order of 8-9 kbps, and generally not exceeding 19 kbps. This slower wireless data transfer rate results in design challenges for manufacturers of wireless portable electronic devices.

One such challenge involves developing a method to efficiently transfer useful information in a bandwidth-constrained environment. For information or data to be useful, the device must include an application or program capable of interpreting or reading the information. When such an application is loaded on the electronic device, the information is said to have a supported format. In the context of using a web browser to view a web page, the web page may include information such as Java programming language components that may only be viewed if a particular plug-in application is installed. In another example, information may include a sound or video file that may only be listened to or viewed if a particular application is present in the electronic device.

For personal computers and other devices utilizing high-bandwidth connections, information may be transferred to the device and later analyzed to determine whether it has a supported format. Using such a method is problematic in the case of a portable device having a limited-bandwidth wireless connection. If unsupported information is sent to the device, the user must wait while the electronic data or file is transferred, only to discover that the information is unusable as the device is presently configured. This is inefficient and frustrating, since the user has wasted time and, if fees are paid for using a wireless network or the like, money.

One solution involves manually disabling receipt of a particular type of information. For instance, a user could select an option that would automatically prevent a particular type of information from being transmitted. In the case of a web browser, the user could select an option to prevent transmission of web pages having embedded Java program language.

One disadvantage of this solution is that that the number and type of applications installed on the device, and thus the data formats supported by those applications, may be in constant flux. Users of electronic devices may add or remove applications at any time. System malfunctions, including file compatibility errors resulting from missing or corrupt application components, may also prevent an application from recognizing information that is otherwise supported, in effect rendering the information unusable. Significant effort is required on behalf of the user, who must regularly determine which applications are functioning and which data formats are supported. Users may be unwilling or unable to survey the entire contents of the device on a regular basis, which may result in transmission of unusable information or improper exclusion of usable information.

Regardless of whether desired information is supported by applications on the electronic device, a user may wish to prevent information from certain source locations from being transmitted to the device. For example, electronic text files transmitted from a particular web site may regularly include viruses or result in device system crashes. In another example, particular source locations may include objectionable subject matter. Thus, while preventing unusable information from being transmitted to the device may be desirable, it may also be desirable to prevent particular usable information from being transmitted.

Thus, there is a need to provide a method for transmitting electronic information over a wireless connection to a portable electronic device while excluding unsupported data and information. There is a further need to provide a method for automatically determining the number and types of information that are supported by applications included in an electronic device. There is still a further need to provide a method for preventing the transmission of information from certain source locations, regardless of whether the information is supported by applications included in the device. There is still yet a further need for automatically preventing unsupported or undesired information from being transmitted over a wireless connection to an electronic device.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

One exemplary embodiment relates to a method of transferring electronic data from a remote location to an electronic device over a bandwidth-constrained connection. The method includes selecting electronic data using an electronic device and determining whether the electronic data has a supported format. The method further includes automatically issuing a transfer instruction for the electronic data based on acceptability criteria, where the acceptability criteria comprises whether the electronic data has a supported format.

Another exemplary embodiment relates to a method of transmitting electronic information to an electronic device. The method includes issuing a request to an information transmission system that electronic information be transmitted to an electronic device and transferring the requested information from a source location to the information transmission system. The method also includes filtering the requested information to exclude incompatible information and wirelessly transmitting the filtered information to the electronic device.

Yet another exemplary embodiment relates to a method of collecting electronic data from a remote source. This method includes sending an electronic data request from an electronic device to a data transmission system, where the electronic device is in wireless communication with the data transmission system. The method also includes gathering the requested data from a remote source and storing a copy of the requested data in the data transmission system and determining within the data transmission device whether the gathered data is compatible with applications included in the electronic device. Finally, the method includes wirelessly transmitting only compatible data to the electronic device.

A further exemplary embodiment relates to a method of filtering electronic data from a remote source location based on the compatibility of the information with applications included in a wireless electronic device. The method includes gathering electronic data from a remote source location within a data transmission system and analyzing the data within the data transmission system to determine its format. The method further includes comparing the format of the data to a list of data formats supported by an electronic device and transmitting to the electronic device only portions of the data having a supported data format.

Still another exemplary embodiment relates to a method of delivering electronic data in a wireless environment. The method includes receiving within a data transmission system a request from a portable electronic device to transfer electronic data from a remote source to the portable electronic device and receiving within the data transmission system a list of data formats supported by applications included in the portable electronic device. The method also includes comparing within the data transmission system the format of the requested data to the list of supported data formats and wirelessly transmitting the requested data to the portable electronic device only if it has a supported format.

Yet still another exemplary embodiment relates to a method of receiving information embedded in an Internet web page. This method includes issuing a request from a portable electronic device to a proxy server, where the request includes a command to transmit electronic information included in an Internet web page originating from a remote location. The method also includes transmitting a list of plug-ins loaded on the portable electronic device to the proxy server and comparing within the proxy server the electronic information to the list of plug-ins to determine if the electronic information is compatible with the loaded plug-ins. Finally, the method includes wirelessly transmitting the electronic information to the portable electronic device only if the information is compatible with the loaded plug-ins.

Yet still further an exemplary embodiment relates to a system for transmitting compatible electronic data to an electronic device over a bandwidth-constrained connection. The system includes an electronic device capable of transmitting and receiving electronic data, an information transmission system in communication with the electronic device and an electronic data source location, and means for requesting transmission of electronic data from the electronic data source location to the electronic device. The system also includes means for filtering the electronic data to transmit only compatible electronic data.

Even further still an exemplary embodiment relates to a system for transferring electronic information from a remote location to a portable electronic device. This system includes an electronic device capable of transmitting and receiving electronic information, a proxy server in wireless communication with the electronic device, and means for generating a list of file types supported by applications included in the electronic device. The system also includes means for transferring the electronic information from a remote location to the proxy server, means for comparing the electronic information to the list of supported file types, and means for wirelessly transmitting electronic information to the electronic device only if the electronic information has a supported file type.

Yet further still, an exemplary embodiment relates to a system for wirelessly transmitting electronic data from a remote source to a portable electronic device. The system includes a data transmission system operating in a wireless network environment and a portable electronic device in wireless communication with the data transmission system and configured for receiving electronic data from the data transmission system. The system further includes means for transmitting requests for electronic data from the portable electronic device to the data transmission system, means for filtering the requested electronic data to exclude incompatible data, and means for transmitting the filtered electronic data from the data transmission system to the portable electronic device.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 3 is a flow diagram illustrating a method of transferring information from a remote source to an electronic device according to an exemplary embodiment.

DETAILED DESCRIPTION OF EXEMPLARY EMBODIMENTS

Figure 1:
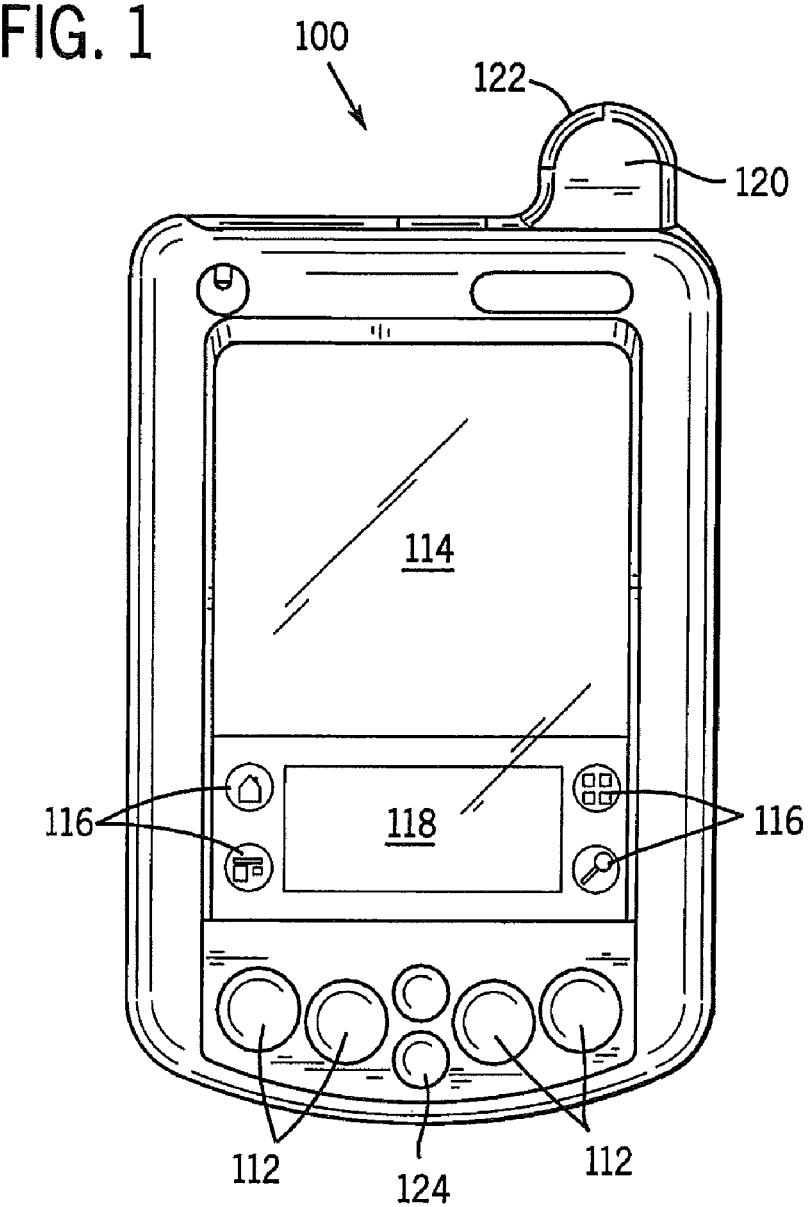
FIG. 1 is an exemplary front elevation view of a portable electronic device in the form of a handheld computer.

Referring to FIG. 1, a portable electronic device 100 is illustrated in the form of a handheld computer, in accordance with an exemplary embodiment. Electronic device 100 may include Palm style computers manufactured by Palm, Inc., of Santa Clara, Calif. Other exemplary embodiments may include Windows CE or Pocket PC handheld computers or other handheld computers and personal digital assistants, as well as mobile telephones, pagers, laptop computers, and other mobile computing devices.

Electronic device 100 may include interactive hardware and software to perform functions such as maintaining calendars, phone lists, task lists and note pads. Calculator applications, spreadsheets, games, video files, and other applications capable of running on a computing device may also be included. Further, electronic device 100 may be configured for such functions as voice memo recording and playback as well as communications network connectivity, Internet connectivity, wireless messaging, e-mail, always-on e-mail, and wireless telephony.

As depicted in the exemplary embodiment of FIG. 1, electronic device 100 may include a plurality of input function keys 112 and a display 114 having graphical user interface (GUI) features. Display 114 may be provided with a touch screen interface that allows a user to select and alter displayed content using a pointer, such as but not limited to a stylus, a pen tip, a fingertip, or other pointing devices. Display 114 may also include a plurality of input icons 116 for performing automated or preprogrammed functions and a writing section 118 for tracing numeric characters as input. Writing section 118 may have associated therewith Graffiti™ or other handwriting recognition software.

In an exemplary embodiment, electronic device 100 may include an integrated antenna 120 configured to transmit and receive wireless communication signals, such as, but not limited to, cellular telephone communication signals and other radio frequency (RF) communications signals using an RF transceiver. Alternatively, electronic device 100 may include an infrared (IR) port for receiving IR signals. Antenna 120 may further include an indicator light 122 integrated into antenna 120 for indicating the transmission and reception of wireless communication signals. Further, light 122 may be used to indicate other states of electronic device 100.

Electronic device 100 may also include navigation buttons 124 for the navigation or scrolling of information displayed on display 114. Further, navigation buttons 124 may be programmed for other uses depending on the application running on electronic device 100. Electronic device 100 may be used for any of a variety of wireless communication functions, including, but not limited to, communications with the World Wide Web, mobile telephone communications, file transfer communications, and e-mail communications.

Figure 2:
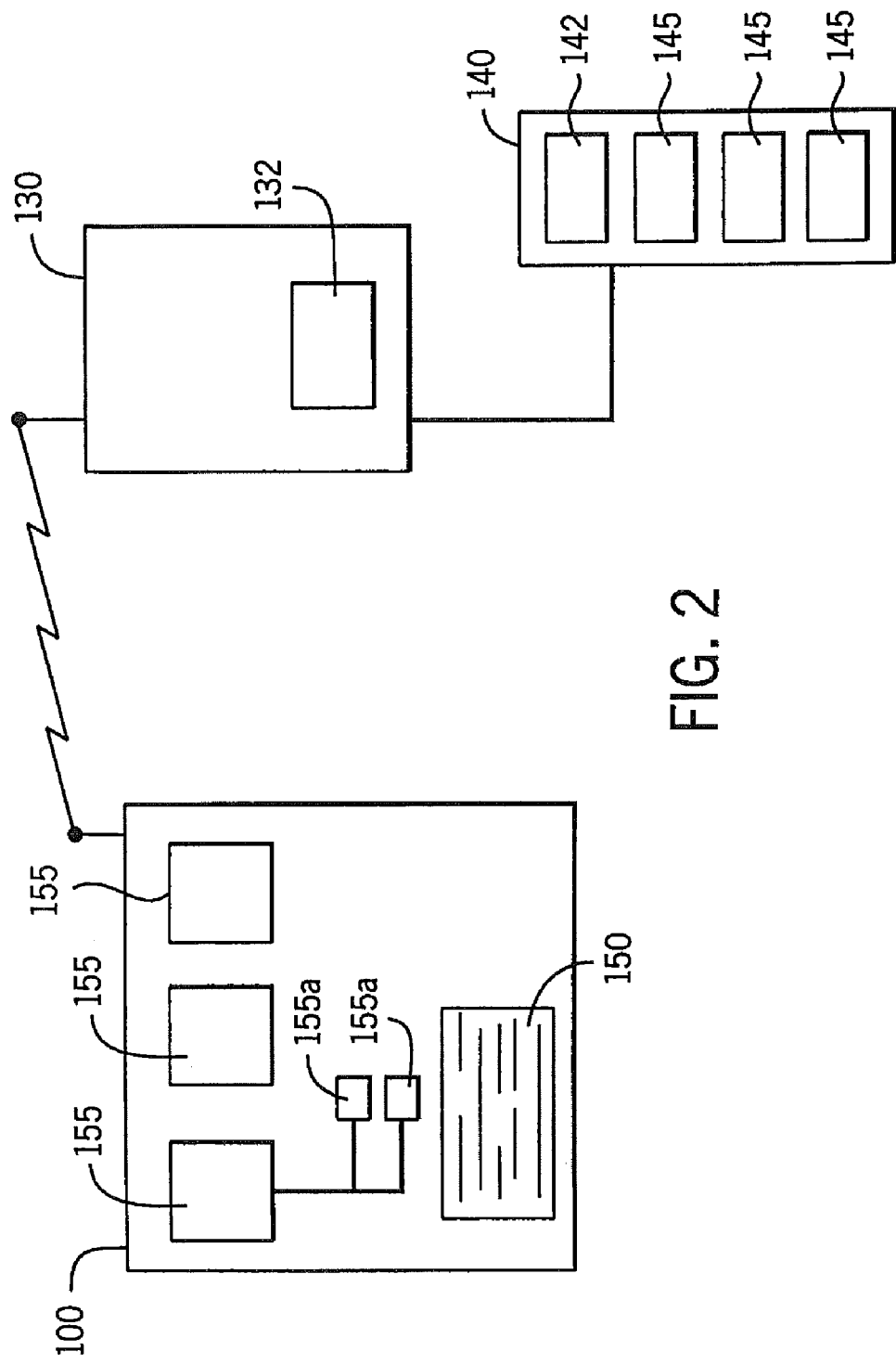
FIG. 2 is an exemplary schematic block diagram illustrating a portable electronic device in wireless communication with an information or data transmission system according to an exemplary embodiment.

FIG. 2 illustrates an exemplary embodiment of a portable electronic device 100 in wireless communication with an information or data transmission system 130. Electronic device 100 includes a list of supported or compatible data formats 150 and a plurality of applications or programs 155. Data transmission system 130 serves to process requests from electronic device 100 and to transmit information 145 from remote electronic data source location 140 to electronic device 100. Thus, data transmission system 130 serves as an interface between electronic device 100 and remote source location 140.

In an exemplary embodiment, data transmission system 130 includes a proxy server 132. Proxy server 132 may be any type of computer server suitable for transmitting and receiving requested electronic information 142. Proxy server 132 and remote source location 140 may be connected using a wireless or wired connection for transferring electronic information 142. Remote source location 140 may include a web server, computer, pager, mobile telephones, other handheld computer, or any other electronic device capable of transmitting electronic data or information. Remote source location 140 also includes stored information 145 that may be requested by a user of electronic device 100.

Proxy server 132 may directly receive requests from electronic device 100 over a wireless connection. Both electronic device 100 and proxy server 132 may be configured to enable wireless communication, including infrared, microwave, RF, or other wireless communication methods. Alternatively, data transmission system 130 may include a wireless carrier network configured to enable wireless communication between data transmission system 130 and electronic device 100. Communications from electronic device 100 may then be forwarded to proxy server 132.

FIG. 3 is a flow diagram illustrating a method of receiving requested information 142 from remote source location 140 according to an exemplary embodiment. Electronic information or data is requested by selecting information 142 to be sent from remote source location 140 to electronic device 100 and sending the request to proxy server 132 over a wireless connection (step 200). Requested information 142 may include information contained in Internet web pages, electronic files (e.g., spreadsheet, graphic, word processing, audio, video files, etc.), or any other electronic information that may be transmitted electronically. In an exemplary embodiment, the request may be sent directly to proxy server 132. In this and other alternative embodiments, proxy server 132 may include an antenna, IR port, or other similar means to receive wireless signals. In an alternative embodiment, the request is sent from electronic computer 100 to data transmission system 130, which then forwards the request to proxy server 132.

A variety of methods may be utilized by the user of electronic device 100 to request information 142. In an exemplary embodiment, a user may enter a URL or web address into a web browser included in electronic device 100. This address will then be transmitted to proxy server 132 and interpreted as a request to transmit information 142 from a remote web server to electronic device 100. In alternative embodiments, a user may activate a hyperlink by clicking, or may use other acceptable methods to request the transfer of information 142. For instance, a displayed web page may include a hyperlink associated with desired electronic information 142 such as an electronic file or information included in another web page. Clicking on the hyperlink using a pointing device or other method of activating the hyperlink operates to send a request to proxy server 132 to transmit the electronic information 142 to electronic device 100. In yet another method of requesting information 142, a user may request that electronic files or other information be downloaded from remote source location 140. Those of skill in the art will recognize that any of a variety of accepted methods of requesting electronic information may be used without departing from the scope of the embodiments disclosed.

In an exemplary embodiment, only requested information having a supported data format will be forwarded to electronic device 100. Supported or compatible data formats are those which may be read or otherwise utilized by applications 155 included in electronic device 100. Simultaneously with the request to transmit information 142, a list of supported or compatible data formats 150 is sent to data transmission system 130 and forwarded to proxy server 132, or sent directly to proxy server 132, as illustrated in box 210. In alternative embodiments, list 150 may be sent either shortly before or shortly after the transmission of the request. In yet another alternative embodiment, list 150 may be maintained within data transmission system 130 or proxy server 132. In this alternative embodiment, data transmission system 130 may have access to the number and type of applications in electronic device 100 and may generate list 150 based on those applications.

Electronic device 100 may include a variety of applications 155, including, but not limited to, personal information management, database, word processing, spreadsheet, and graphics processing applications. Electronic device 100 may also include applications 155 configured for wireless telephony and e-mail functions. In an exemplary embodiment, a web browser application may be included in electronic device 100. Each application 155, including the web browser, may in turn have associated with it several additional applications or programs 155a. For example, a web browser may include various applications 155a designed to process certain types of information. Applications 155a are sometimes referred to as plug-ins, applets, or sub-applications. One example of a plug-in would be an application used by a web browser to interpret Java program language to allow the web browser to display web pages embedded with Java components. Other examples include plug-ins designed to recognize certain graphic, audio, video, productivity, or other file formats. In the context of a word processing program, the program may include an application 155a designed to read documents stored in a variety of formats, such as those created by other word processing or text creation programs. For ease of reference, the following description uses the number 155 to refer both to applications 155 and sub-applications 155a.

In this manner, a variety of data or information formats may be supported by, or compatible with, applications 155 included in electronic device 100. The number and type of supported formats will depend on the number and type of applications 155 loaded in electronic device 100. List 150 may include every type of data format that may be utilized by applications 155 included in electronic device 100. Thus, if a particular word processing program may read files created by several text creation programs, whether directly or by converting the files to a readable format, every format compatible with the word processing program may be included in list 150. Similarly, if several plug-ins are loaded for use with a web browser, every type of graphic, audio, video, and other format that may be utilized by the web browser may appear in list 150.

In an exemplary embodiment, list 150 may be updated prior to transmission to reflect the current state of applications 155 included in electronic device 100. Thus, in response to a request to receive electronic information 142, an application 155 in a web browser or elsewhere in electronic device 100 examines the applications included in electronic device 100 to determine every supported data format. List 150 may also be updated in response to changes in applications 155 as they occur. If an application 155 is added to or removed from electronic device 100, list 150 may be updated to include or exclude data formats affected by the installation or removal. Additionally, if a file compatibility error has occurred, such that data formats normally supported by a particular application 155 may not be used by the application as currently configured, list 150 may also be updated to reflect that fact. File compatibility errors may occur when a portion of the application 155 has become corrupt or inoperable, such that certain data formats previously supported may not be utilized by the application 155. Viruses or changes to the operating system, among other things, may cause file compatibility errors.

In a particular exemplary embodiment, while list 150 may be automatically updated as described above, a user may manually alter the contents of list 150 as well. In certain situations, a user may wish to prevent certain supported data formats from being transmitted to electronic device 100. For example, certain graphic or video files may be supported by applications in electronic device 100 but may be too large to transfer efficiently over a wireless connection. In another situation, the files may cause a drain in system resources (e.g., permanent memory space, random access memory, etc.). In these cases, the user may override the inclusion of particular data formats in list 150. A user may select an option to exclude all graphics or video formats, or may choose individual formats from a list of included formats. In the opposite situation, a user may wish to include unsupported data formats in list 150. For example, a user may wish to receive certain information 142 in electronic device and then transfer that information to another device having applications which support its particular data format. Here, the user would simply add the particular data format to list 150 despite the fact that application 155 included in electronic device 100 may not itself use information 142.

In an exemplary embodiment, list 150 is generated within electronic device 100. One advantageous feature of doing so is that computing resources in data transmission system 130 or proxy server 132 are conserved, since this function is performed by a remote device. In an alternative embodiment, list 150 may be created in proxy server 132 or elsewhere in data transmission system 130. In this alternative embodiment, a list of applications included in electronic device 100 may be sent from electronic device 100 or otherwise accessed by the proxy server 132 or data transmission system 130, and list 150 may be generated based on the list of applications. Thus, information pertaining to data formats supported by particular applications may be included in or accessible by proxy server 132 or data transmission system 130.

After receiving both the request to transfer information 142 and list 150 (or alternatively, after generating list 150), proxy server 132 locates remote source location 140 associated with requested information 142, as shown in box 220. Remote source location 140 may be proxy server 132 itself, a personal computer, web server, other portable electronic device, personal computer, or any other electronic device capable of storing and transmitting information. Proxy server 132 gathers the information 142 by issuing a request that information 142 be transferred from remote location 140 to proxy server 132, as shown in box 230. In an exemplary embodiment, information 142 is then either temporarily or permanently stored within proxy server 132. Alternatively, proxy server 132 may act as a conduit for information 142 by directly passing it to electronic device 100.

Proxy server 132 then analyzes information 142 to determine its data format, as shown in box 240. For example, if information 142 is a graphic embedded in a web page, proxy server 132 determines the type of graphic (e.g., .TIFF, .JPEG, .GIF, etc.). To determine the data format, information 142 itself is analyzed by proxy server 132. One advantageous feature of analyzing the information itself is that in certain situations information 142 may have an erroneous file name extension (e.g., a graphic may be labeled with a GIF extension when the graphic is really a .JPEG image). Determining the data format by merely examining the file name in this case would have the effect of incorrectly reporting the data format. This result is avoided by examining the actual information itself to determine its data format.

In box 250, proxy server 132 compares the data format of information 142 to the list of supported formats 150 to determine whether information 142 is compatible with applications included in electronic device 100. If information 142 has a data format matching a data format included in list 150, the information 142 has a supported format. If the information data format is not included in list 150, it does not have a supported format.

In addition to the list of supported data formats 150, a list of unacceptable remote source locations may be generated in electronic device 100 and utilized by proxy server 132. An unacceptable source location may be one that has historically been the source of corrupt or inoperable information, viruses, or other objectionable content such as adult-oriented material, pirated software, or the like. The list of unacceptable source locations will typically be updated manually by a user of electronic device 100. Proxy server 132 then compares the source location 140 of information 142 with the list of unacceptable source locations to determine if information 142 has an unacceptable source location. If the source location is not included in the list of unacceptable source locations, proxy server 132 will assume that information 142 has an acceptable source location.

Whether information 142 has a supported format or an acceptable source location may be acceptability criteria that are used in determining whether to transmit information 142 to electronic device 100. Based on these or other acceptability criteria, proxy server 132 issues a transfer instruction for information 142, as shown in box 260. The transfer instruction may include an instruction either to transfer or not to transfer information 142 to electronic device 100. Thus, in an exemplary embodiment, only where information 142 has a supported data format and an acceptable source location will proxy server 132 issue a transfer instruction resulting in the transfer of information 142 to electronic device 100 over a wireless connection. If, on the other hand, information 142 has either an unsupported format or an unacceptable source location, the transfer instruction will comprise an instruction not to send information 142 to electronic device 100. In an alternative embodiment, only the list of supported data formats 150 will be used by proxy server 132, and the only acceptability criterion may be whether information 142 has a supported format. In this alternative embodiment, the source location of the information 142 is not relevant to the transfer instruction, and only where information 142 has a supported format will it be wirelessly transmitted to electronic device 100.

An advantageous feature of the use of acceptability criteria to filter information 142 within proxy server 132 is that unsupported or unacceptable material may be automatically filtered from information 142. This filtration prevents unusable information from being transmitted over a wireless connection, saving the user of electronic device 100 time and perhaps money. Where information 142 includes both supported and unsupported information, proxy server 132 may transmit only the supported portion of the information. For example, where a requested web page includes both a supported graphic file and an unsupported sound file, the unsupported sound file may be filtered out by proxy server 132, so that only the supported graphic file will be transmitted. In another embodiment, proxy server 132 may prevent the entirety of information 142 from being transmitted if it contains any unsupported information. Thus, in the preceding example, neither the supported graphic file nor the unsupported sound file will be transmitted. One advantageous feature of this embodiment is that it prevents the transmission of partial or incomplete information to the user of electronic device 100. In certain situations, partial information will have little value for the requester of information 142. For example, if a single file includes both video and sound components, and one or the other of the components is unsupported, it may be desirable to prevent transmission of the supported component by itself.

In an exemplary embodiment, where some or all of information 142 has an unsupported format or unacceptable source location, proxy server 132 may send a message indicating that fact to the user of electronic device 100. In an alternative exemplary embodiment, proxy server 132 may send a message to the user giving the user an option of storing information 142 in proxy server 132 until a supporting application 155 is installed in electronic device 100 or the source location is deemed acceptable. One advantageous feature of this alternative embodiment is that if a user locates useful information that happens to have an unsupported format, the user will not have to search for the information again once an appropriate application 155 is loaded into electronic device 100. Instead, the user can keep information 142 at the remote proxy server 132, obtain the appropriate application 155, and later retrieve the information from proxy server 132.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of transferring electronic data from a remote location to an electronic device over a bandwidth-constrained wireless connection, the method comprising the steps of:
   sending a list of supported formats from the electronic device to a proxy server;
   selecting electronic data using the electronic device;
   using the proxy server to determine whether the electronic data has a supported format;
   automatically issuing a transfer instruction from the proxy server for the electronic data based on acceptability criteria, the acceptability criteria comprising whether the electronic data has a support format;
   wherein the transfer instruction includes an instruction to only send the electronic data if the electronic data has a supported format; and
   automatically updating without any trigger by a user the list of supported formats to reflect the changes in applications included in the electronic device, the update selected from the group consisting of the addition of an application to the electronic device, the removal of an application from the electronic device, and the occurrence of a file compatibility error in the electronic device.

2. The method of claim 1, wherein the list of supported formats is sent to the proxy server upon selecting the electronic data.

3. The method of claim 1, further comprising automatically updating the list of supported formats after a file compatibility error occurs in the electronic device.

4. The method of claim 1, further comprising manually updating certain of the list of supported formats.

5. The method of claim 1, wherein selecting electronic data comprises sending a request to view an Internet web page.

6. The method of claim 5, wherein sending a request to view an Internet web page comprises entering an Internet web page address in an Internet web browser.

7. The method of claim 5, wherein sending a request to view an Internet web page comprises activating a hyperlink.

8. The method of claim 1, wherein selecting electronic data comprises sending a request to transfer an electronic file.

9. The method of claim 8, wherein sending a request to transfer an electronic file comprises issuing a request to download the electronic file from a remote source location.

10. The method of claim 1, wherein the electronic device is selected from the group consisting of a handheld computer, a pager, and a mobile phone.

11. The method of claim 1, wherein determining whether the electronic data has a supported format comprises examining the electronic data to determine its format.

12. The method of claim 1, wherein determining whether the electronic data has a supported format comprises comparing the selected data format to a list of supported formats.

13. The method of claim 1, wherein the step of determining whether the electronic data has a supported format and the step of issuing a transfer instruction are performed by a proxy server.

14. The method of claim 1, wherein the transfer instruction comprises an instruction to transfer the electronic data to the electronic device.

15. The method of claim 14, wherein a transfer instruction comprises an instruction to transfer the electronic data over a wireless connection.

16. The method of claim 1, further comprising transferring the selected electronic data in response to the transfer instruction.

17. The method of claim 1, wherein the electronic data is selected from the group consisting of electronic audio, video, graphic, applet, program, and Internet web page plug-in files.

18. The method of claim 1, further comprising sending a list of unacceptable source locations to a proxy server.

19. The method of claim 18, wherein the acceptability criteria further comprises whether the electronic data has an acceptable source location.

20. The method of claim 19, wherein the electronic data has supported format and an unacceptable source location and the transfer instruction comprises an instruction not to send the electronic data to the electronic device.

21. A method of transmitting select electronic information to an electronic device over a wireless connection, the method comprising the steps of:
  issuing a request to an information transmission system for select electronic information to be transmitted to an electronic device;
  transferring the select electronic information requested from a source location to the information transmission system;
  filtering the select electronic information requested to exclude any incompatible information;
  wirelessly transmitting the filtered information to the electronic device in a format as transferred to the information transmission system;
  sending a list of supported formats from the electronic device to the filtering system; and
  automatically updating without any user trigger the list of supported formats when an update event occurs, the update event selected from the group consisting of the addition of an application to the electronic device, the removal of an application from the electronic device, and the occurrence of a file compatibility error in the electronic device.

22. The method of claim 21, wherein the list of supported formats is sent to the filtering system upon issuing the request that electronic information be transmitted.

23. The method of claim 21, further comprising manually updating certain of the list of supported formats.

24. The method of claim 21, wherein the information transmission system comprises a proxy server configured to determine whether the requested electronic information has a supported format.

25. The method of claim 21, wherein filtering the requested information to exclude incompatible information comprises comparing the format of the requested information to a list of supported formats and excluding information that does not have a format included in the list of supported formats.

26. The method of claim 21, wherein the electronic device is selected from the group consisting of a laptop computer, a handheld computer, a pager, and a mobile phone.

27. The method of claim 21, wherein the information transmission system comprises a proxy server and a wireless network.

28. The method of claim 21, wherein issuing a request that electronic information be transmitted includes at least one of entering an Internet web page address in an Internet web browser, activating a hyperlink, and issuing a request to transfer an electronic file.

29. The method of claim 21, wherein the source location is selected from the group consisting of a computer, an electronic file server, and another electronic device.

30. The method of claim 21, further comprising sending a list of unacceptable source locations to the information transmission system and filtering the requested information to exclude information having an unacceptable source location.

31. A method of collecting electronic data from a remote source over a wireless connection, the method comprising the steps of:
  sending an electronic data request from an electronic device to a data transmission system, the electronic device being in wireless communication with the data transmission system;
  gathering the requested data from a remote source and storing a copy of the requested data in the data transmission system;
  determining within the data transmission device whether the gathered data is compatible with application included in the electronic device;
  wirelessly transmitting only compatible data to the electronic device, wherein the compatible data is transmitted in the same format in which it was gathered;
  sending a list of supported formats from the electronic device to the data transmission system; and
  automatically updating without any user tripper the list of supported formats when an update event occurs, the update event selected from the group consisting of the addition of an application to the electronic device, the removal of an application from the electronic device, and the occurrence of a file compatibility error in the electronic device.

32. The method of claim 31, wherein the data transmission system comprises a proxy server and means for wirelessly transmitting and receiving data.

33. The method of claim 31, wherein the list of supported formats is sent to the data transmission system upon sending the electronic data request.

34. The method of claim 31, further comprising manually updating certain of the list of supported formats.

35. The method of claim 31, wherein determining whether the gathered data is compatible with applications included in the electronic device comprises comparing the format of the gathered data with a list of formats supported by applications included in the electronic device.

36. The method of claim 31, wherein the electronic device is selected from the group consisting of a laptop computer, a handheld computer, a pager, and a mobile phone.

37. The method of claim 31, wherein sending an electronic data request includes at least one of entering an Internet web page address in an Internet web browser, activating a hyperlink, and issuing a request to transfer an electronic file.

38. The method of claim 31, wherein the remote source is selected from the group consisting of a computer, an electronic file server, and another electronic device.

39. The method of claim 31, further comprising sending a list of unacceptable source locations to the data transmission system and transmitting only data not having an unacceptable source location.

40. A method of filtering electronic data from a remote source location based on the compatibility of the information with applications included in a wireless electronic device, the method comprising the steps of:
  gathering electronic data from a remote source location within a data transmission system over a wireless connection;
  analyzing the data within the data transmission system to determine its format;
  comparing the format of the data to a list of data formats supported by an electronic device;
  transmitting to the electronic device only portions of the data having a supported data format as gathered;
  wherein the list of supported data formats is generated within the electronic device and sent to the data transmission system; and
  automatically updating without any user trigger the list of supported formats when an update event occurs, the update event selected from the group consisting of the addition of an application to the electronic device, the removal of an application from the electronic device, and the occurrence of a file compatibility error in the electronic device.

41. The method of claim 40, further comprising sending a list of applications included in the electronic device to the data transmission system, wherein the list of supported formats is generated within the data transmission system based on the list of applications.

42. The method of claim 40, further comprising manually updating certain of the list of supported formats.

43. The method of claim 40, wherein the electronic device is selected from the group consisting of a laptop computer, a handheld computer, a pager, and a mobile phone.

44. The method of claim 40, further comprising sending a list of unacceptable remote source locations to the data transmission system and transmitting only data not having an unacceptable remote source location.

45. A method of delivering electronic data over a wireless connection, the method comprising the steps of:
  receiving within a data transmission system over the wireless connection a request from a portable electronic device to transfer electronic data from a remote source to the portable electronic device;
  receiving within the data transmission system a list of data formats supported by applications included in the portable electronic device;
  downloading the requested data to the data transmission system;
  comparing within the data transmission system the format of the requested data to the list of supported data formats; and
  wirelessly transmitting without any user trigger the requested data to the portable electronic device only if it has a supported format as received; and wherein the list of supported data formats is received simultaneously with the request from the portable electronic device; and
  automatically updating without any user trigger the list of supported formats when an update event occurs, the update event selected from the group consisting of the addition of an application to the electronic device, the removal of an application from the electronic device, and the occurrence of a file compatibility error in the electronic device.

46. The method of claim 45, wherein the data transmission system comprises a proxy server.

47. The method of claim 45, wherein the list of supported formats received comprises a list of formats supported by the portable electronic device at the time the request from the portable electronic device is received.

48. The method of claim 45, wherein the request to transfer electronic data is request to view an Internet web page.

49. The method of claim 45, wherein the request to transfer electronic data is a request to transfer an electronic file to the portable electronic device.

50. The method of claim 45, wherein the portable electronic device is selected from the group consisting of a laptop computer, a handheld computer, a pager, and a cellular telephone.

51. The method of claim 45, further comprising sending a list of unacceptable remote sources and wirelessly transmitting the requested data to the portable electronic device only if the data does not have an unacceptable remote source.

52. A method of receiving information embedded in an Internet web page over a wireless connection, the method comprising the step of:
  issuing a request from a portable electronic device to a proxy server, the request comprising a command to transmit electronic information included in an Internet web page originating from a remote location;
  transmitting a list of plug-ins loaded on the portable electronic device to the proxy server;
  comparing within the proxy server the electronic information to the list of plug-ins to determine if the electronic information is compatible with the loaded plug-ins;
  wireless transmitting the electronic information to the portable electronic device only if the information as received by the proxy server is compatible with the loaded plug-ins; and
  automatically updating without any user trigger the list of supported formats when an update event occurs, the update event selected from the group consisting of the addition of an application to the electronic device, the removal of an application from the electronic device, and the occurrence of a file compatibility error in the electronic device.

53. The method of claim 52, wherein the list of plug-ins includes all operational plug-ins included in the portable electronic device at the time of the request.

54. The method of claim 52, wherein the list of plug-ins is automatically updated automatically to reflect changes in the portable electronic device prior to transmitting the list of plug-ins to the proxy server.

55. The method of claim 52, wherein the portable electronic device is selected from the group consisting of a laptop computer, a handled computer, a pager, and a mobile phone.

56. The method of claim 52, wherein the remote location is selected from the group consisting of a server computer and another portable electronic device.

57. The method of claim 52, further comprising generating a list of unacceptable remote locations and wirelessly transmitting the electronic information to the electronic device only if the web page does not originate from an unacceptable remote location.

58. A system for transmitting compatible electronic data to an electronic device over a bandwidth-constrained wireless connection, the system comprising:

an electronic device capable of transmitting and receiving electronic data;

an information transmission system in communication with the electronic device and an electronic data source location;

means for requesting transmission of electronic data from the electronic data source location to the electronic device; and means for filtering the electronic data to transmit only compatible electronic data in a format as provided by the electronic data source location;

wherein the means for filtering the electronic data comprises means for comparing the format of the electronic data to a list of data formats being received from the electronic device, wherein the list of supported data formats is automatically updated without user trigger when applications are installed on and removed from the electronic device, the update selected from the group consisting of the addition of an application to the electronic device, the removal of an application from the electronic device, and the occurrence of a file compatibility error in the electronic device.

59. The system of claim 58, wherein the electronic device is selected from the group consisting of a laptop computer, a handheld computer, a pager, and a mobile phone.

60. The system of claim 58, wherein the information transmission system is in wireless communication with the electronic device.

61. The system of claim 58, wherein the information transmission system comprises a proxy server.

62. The system of claim 58, wherein the information transmission comprises a wireless network.

63. The system of claim 58, wherein the list of supported data formats is automatically updated when a file compatibility error occurs in the electronic device.

64. The system of claim 58, wherein certain of the list of supported data formats is manually updated by a user.

65. The system of claim 58, further comprising means for filtering the electronic data to transmit only electronic data originating from acceptable source locations.

66. The system of claim 65, wherein the means for filtering the electronic data to transmit only electronic data originating from acceptable source locations comprises means for comparing the source location of the electronic data to a list of unacceptable source locations.

67. The system of claim 58, wherein the electronic data is included in an Internet web page.

68. The system of claim 58, wherein the means for requesting transmission of electronic data comprises sending a request to view an Internet web page.

69. The system of claim 58, wherein the means for requesting transmission of electronic data comprises sending a request to transmit an electronic file.

70. A system for transferring electronic information from a remote locations to a portable electronic device automatically without user trigger over a wireless connection, the system comprising:

an electronic device capable of transmitting and receiving electronic information;

a proxy server in wireless communication with the electronic device;

means for generating a list of file types supported by applications included in the electronic device;

means for transferring electronic information from a remote location to the proxy server;

means for comparing electronic information to the list of supported file types;

means for wirelessly transmitting electronic information to the electronic device only if the electronic information has a supported file type as a transferred to the proxy server; and means for automatically updating without any user trigger the list of supported formats when an update event occurs, the update event selected from the group consisting of the addition of an application to the electronic device, the removal of an application from the electronic device, and the occurrence of a file compatibility error in the electronic device.

71. The system of claim 70, wherein the electronic device is selected from the group consisting of a computer, a handheld computer, a pager, and a mobile phone.

72. The system of claim 70, wherein the list of supported file types is automatically updated when applications are installed on and removed from the electronic device.

73. The system of claim 70, wherein the list of supported file types is automatically updated when a file compatibility error occurs in the electronic device.

74. The system of claim 70, further comprising means for transmitting electronic information to the electronic device only if the electronic information originates from an acceptable remote location.

75. A system for wirelessly transmitting electronic data from a remote source to a portable electronic device over a wireless connection, the system comprising:

a data transmission system operating in a wireless network environment;

a portable electronic device in wireless communication with the data transmission system and configured for receiving electronic data form the data transmission system;

means for transmitting requests for electronic data from the portable electronic device to the data transmission system;

means for filtering the requested electronic data to exclude incompatible data based on a list of data formats supported by applications included in the portable electronic device, the list of supported data formats being received from the portable electronic device; and means for transmitting the filtered electronic data in a format provided by the remote resource from the data transmission system to the portable electronic device; and automatically updating without user trigger the list of supported data formats when an application is added to or removed from the portable electronic device.

76. The system of claim 75, wherein the data transmission system comprises a proxy server.

77. The system of claim 75, wherein the portable electronic device is selected from the group consisting of a laptop computer, a handheld computer, a page, and a cellular telephone.

78. The system of claim 75, wherein the means for filtering the electronic data to exclude incompatible data comprises means for comparing the format of the electronic data to the list of data formats supported by applications included in the portable electronic device.

79. The system of claim 78, wherein the list of supported data formats is automatically updated when a file compatibility error occurs in the electronic device.

80. The system of claim 78, wherein certain of the list of supported data formats is manually updated by a user.

81. The system of claim 80, further comprising means for filtering the requested electronic data to exclude electronic data originating from an unacceptable source.

82. The system of claim 80, wherein the electronic data is selected from the group consisting of electronic audio, video, graphic, applet, program, and plug-in files.

83. The system of claim 75, wherein the means for transmitting requests for electronic data comprises a web browser.

84. The system of claim 83, wherein the electronic data comprises information included in an Internet web page.

* * * * *

UNITED STATES PATENT AND TRADEMARK OFFICE
CERTIFICATE OF CORRECTION

PATENT NO. : 7,610,350 B2 Page 1 of 1
APPLICATION NO. : 09/917070
DATED : October 27, 2009
INVENTOR(S) : Abdulrahiman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Twelfth Day of October, 2010

David J. Kappos
*Director of the United States Patent and Trademark Office*